Nov. 22, 1949　　　　　　　C. CROSS　　　　　　　2,488,711
HIGH-CURRENT BATTERY CHARGING SYSTEM
Filed June 1, 1948
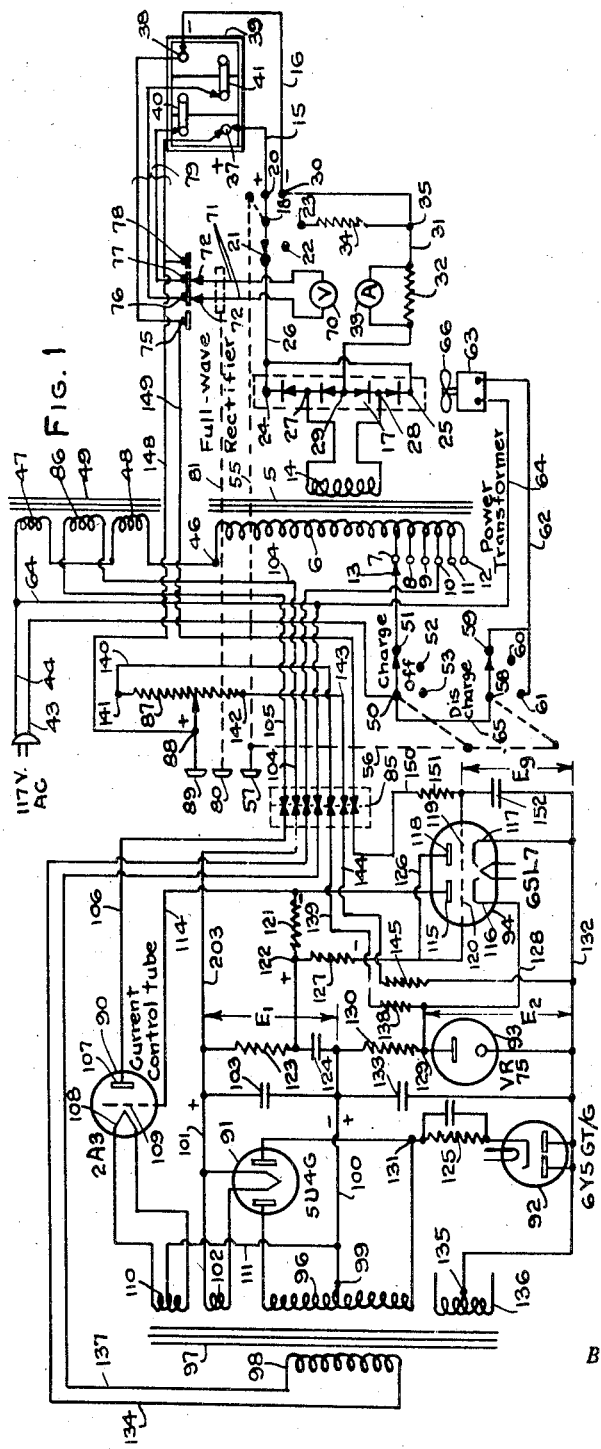
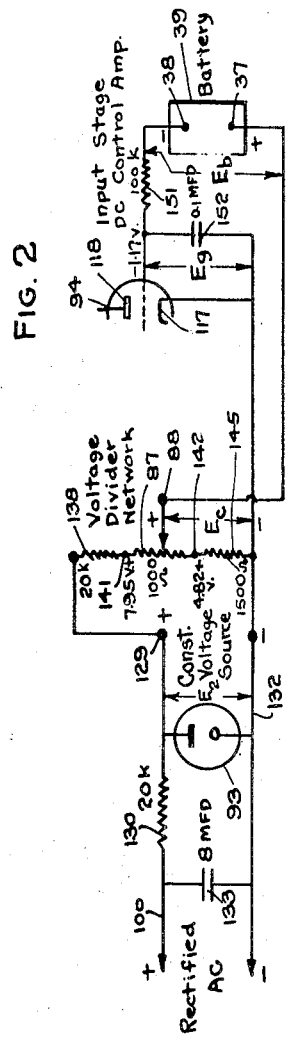
INVENTOR.
CHARLES CROSS
BY
Leon Edelson
Attorney Patented Nov. 22, 1949

2,488,711

UNITED STATES PATENT OFFICE 2,488,711

HIGH-CURRENT BATTERY-CHARGING SYSTEM

Charles Cross, Philadelphia, Pa., assignor to Lanagan & Hoke, Inc., Philadelphia, Pa., a corporation of Pennsylvania Application June 1, 1948, Serial No. 30,341

14 Claims. (Cl. 320—24)

The present invention relates to a high current battery charging system. Battery charging systems of this type are used primarily for charging automobile batteries and the like at a relatively high amperage rate in order to cut down the charging time required to place the battery again in service. There is often the danger in charging automobile batteries and the like at high charging rates, of overcharging the battery by exceeding the prescribed time for the complete charge or exceeding the minimum permissible charging rate which also has an effect upon the battery as is well known, tending to shorten its useful life.

It is desirable, therefore, in the fast charging of automobile batteries and the like, to apply a predetermined current such, for example, as 100 amperes, and to permit the charge rate or current value to decrease gradually as the battery comes up to full charge, thereby preventing overcharging and the application of higher currents thereto than are initially established when the charging current is first applied to the battery. Various systems and expedients have been provided in the past for effecting this desirable charging arrangement but all presently known systems provide either complicated control circuits involving operating and service difficulties or require the attention of an operator to obtain a proper charge for the battery.

It is, therefore, a primary object of this invention, to provide an improved and simplified high current battery charging system which is simple in operation and construction and which effectively provides a safe high current charge with a proper tapering of the charge as the battery charging approaches completion and without the attention of an operator.

It is a further object of the invention, to provide an improved high current battery charging system which may readily be installed with a minimum of electrical connections and with substantially unskilled labor, and which is relatively easy to operate and to service.

It is a still further object of the invention to provide a high current battery charging system in which the charging rate may readily be adjusted to any desired value and which may automatically be controlled thereafter in accordance with the rate at which the battery takes the charge.

The invention contemplates the provision of an alternating current source of supply for the charging and control currents whereby it may readily be attached to existing alternating current supply sources which are universally available.

Accordingly, it is also an object of the invention, to provide a high current battery charging system having a rugged full-wave rectifier and a power transformer supply circuit controllable by a saturable reactor included in a current control unit to which is connected a plug-in type voltage control unit, likewise wholly operable in connection with an alternating current supply source. A system of this type is adapted for easier servicing and installation by reason of the fact that the voltage control unit is detachably connected with the remainder of the system through a plug-in connection and, therefore, may easily be removed or detached for servicing and inspection.

It may also be considered to be an object of the invention, to provide an alternating current operated high current battery charging system which may be connected with any available alternating current power supply source and which is provided with a minimum number of operating controls and indicating devices for complete control of the charging operation.

The invention further contemplates the provision of means in the charging system for testing the charged battery under lead conditions by operation of a single switch means, and for energizing and de-energizing the apparatus by the same unitary means, whereby switching operations and control of the charging operation is simplified.

The invention will, however, be further understood from the following description, when considered in connection with the accompanying drawing, showing a present preferred embodiment of the invention, and its scope will be pointed out in the appended claims.

In the drawing:

Figure 1 is a schematic circuit diagram of a high current battery charging system embodying the invention; and Figure 2 is a further schematic circuit diagram of a portion of Figure 1 illustrating certain details of the invention.

Referring to Figure 1, a power transformer 5 for the battery charging system is provided with a primary winding 6 adapted to be connected to any convenient source of alternating current power such as the usual 115-120 volt power supply receptacle. The primary is provided at one end with a series of taps 7 to 12 inclusive provided with an adjustable connector 13.

The secondary 14 of the transformer is of the low voltage, high current type, for effectively stepping down the high voltage from the primary to a voltage suitable for charging batteries of any desired number of cells which, in the present example, may be assumed to be the usual three-cell storage battery for automobile and other portable use. The secondary should be capable of supplying currents of the order of from 100 to 200 amperes continuously and is connected to a pair of heavy battery charging leads 15 and 16 through a full-wave rectifier unit 17 and a control switch 18, as indicated.

The lead 15 is connected to a positive output terminal 20 which in turn is connected to the switch 18 which is adapted to be moved to three different positions or contact points 21, 22 and 23. In the position shown, the switch completes connection with the contact 21 which, in turn, is connected through a lead 26 with end terminals 24 and 25 of the rectifier stack. Intermediate terminals 27 and 28 for the stack are connected to the terminals of the secondary 14, and a center terminal 29 is connected with the lead 16 through a negative output terminal 30 and a lead 31 in which is connected an ammeter shunt 32 adapted to carry at least 100 amperes. A suitable meter 33 is connected to the terminals of the shunt 32 for indicating the charging current.

The contact 22 of the switch 18 is open, whereas the contact 23 is connected with one end of a heavy discharge resistor 34, the opposite end of which is connected, as indicated at 35, with the negative battery charging lead 16 and the terminal 30 through the lead 31. The battery charging leads 15 and 16 may be of the flexible cable type and may be of any desired length for reaching from the charging system output terminals 20 and 30 to any suitable battery location.

In the present example, the leads 15 and 16 are shown connected with the positive and negative terminals 37 and 38 respectively of a standard three-cell automobile storage battery 39 having the usual strap connections 40 and 41 between the cells, thereby providing a normal 5 to 8 volts at the terminals 37 and 38, depending upon the condition of charge of the battery.

The primary 6, of the power transformer, is connected with a pair of alternating current supply leads 43 and 44 having the usual connection plug 45. The supply lead 44 is connected with one terminal 46 of the primary through a pair of series connected reactor windings 47 and 48 on a saturable reactor 49. The lead 43 is connected to a power switch 50 corresponding to the charging control switch 18, and having three contact points 51, 52 and 53. The contact point 51 is connected with the tap 13 for the tap connections 7—12 at the opposite end of the transformer primary winding 6, being shown in connection with the terminal 7. As the tap 13 is moved in the direction of the terminal 12, the step-down ratio is increased, thereby cutting down the charge rate on the battery, or conversely, being adapted to adjust the charge rate to approximately a desired value to compensate for differences in supply voltage as encountered at various locations.

It will be seen that when the switch 50 is closed to the contact 51 and the tap 13 is adjusted to a desired tap connection on the transformer primary, alternating current is applied to the primary 6 through the coils 47 and 48 of the saturable reactor 49, and the secondary 14 of the transformer is thereby energized, thereby providing relatively smooth rectified direct current at the charger output terminals 20 and 30 for application to the battery 39 through the charging leads 15 and 16.

When the power switch 50 is operated to provide connection with the terminals 52 and 53, an open circuit is established, thereby de-energizing the power transformer primary and cutting off the charge from the battery. It will be noted that the power switch 50 and the charging control switch 18 are interconnected for simultaneous selective operation in unison, from point to point as indicated by the dotted lines 55—56, representing any suitable operating connection between the switches which may be actuated by a suitable control element or knob indicated at 57.

The control knob 57 is further connected with a third three-point motor control switch indicated at 58, having three contact points 59, 60 and 61, the first and last being interconnected as shown and provided with a lead 62 for connection with one terminal of an electric motor 63. The opposite terminal of the motor is connected through a supply lead 64 with the main supply lead 44. The switch arm 58 is connected through a lead 65 with the switch arm 50 whereby the motor is energized through connection with the supply lead 43 when the switch is closed to the contact 59 or 61.

The motor is provided with a ventilating fan or blower indicated at 66, associated with the rectifier stack 17 and therefore operates as will be seen from the foregoing arrangement, when the three-point control switch is closed either to the charge or discharge positions indicated, but is de-energized when the switch is moved to the central or off position.

In the "off" position it will be seen that the switch 18 is connected with the contact 22 and the switches 50 and 58 respectively are connected with the contacts 52 and 60, thereby disconnecting the battery from the rectifier, de-energizing the primary of the power transformer and opening the rectifier blower motor circuit. All three operating positions are conveniently controlled from one point by means of the controlling device or knob 57 which may be placed in such a position that the ammeter 33 may be observed as the switches are operated.

The elements thus far described comprise the main current controlling unit for the high current battery charging system and with suitable attendance on the part of an operator and proper adjustment of the charging current by means of the tap 13 a certain degree of charging efficiency may be obtained for certain batteries adapted to receive a relatively high charging rate, without the aid of the hereinafter described voltage control unit which automatically controls the charging rate in conjunction with manual control means, also hereinafter described, for adjusting the charging rate exactly to any desired value.

It will be noted that when the three-unit power control switch is moved to the discharge position, in which the switch 50 is connected with the contact 53 and the switch 58 is connected with the contact 61, the ventilating or cooling fan for the rectifier stack is operated, thereby further cooling the rectifier stack during the testing operations on the battery. The test operations are made with the switch 18 connected to the contact 23, whereby the load resistor 34 is automatically connected in shunt with the battery terminals 37 and 38, thereby establishing on the battery a load condition simulating that of actual operation, and to a much higher degree, depending upon the value of the resistor 34.

With the battery so loaded, the individual cells may be tested for proper voltage through the medium of a low voltage voltmeter 70 connected through leads 71 with a pair of jointly movable switch points 72 which are movable in unison to engage four spaced fixed switch points 75 to 78 inclusive, which in turn are connected through cabled leads 79 respectively with the battery terminal 38, the strap 41, the strap 40 and the terminal 37.

The switch points 72 may be moved by any suitable means such as a control knob 80 connected therewith, as indicated by the dotted connection 81. It will be seen that by this arrangement the switch points may be moved from the center position shown, to the right or to the left, to engage alternatively the right and left hand pairs of contacts, whereby each of the three battery cells may be consecutively or selectively connected with the volt-meter 70, thereby to read the voltage of each individual cell. Normally the switch is positioned centrally as shown, to provide normal reading of the middle cell during the charging operation.

Further, in accordance with the invention, the current control unit and the battery charging rate is controlled by the voltage control unit shown in the left hand portion of Figure 1 and is connected therewith through a separable plug connector indicated at 85. Control is effected through a saturating winding 86 on the saturable reactor 49 and a control potentiometer 87 external to and forming part of the voltage control unit and provided with a movable control contact 88 having a control knob 89 therefor. As will hereinafter be described, adjustment of the contact 88 serves to control the value of the current from the voltage control unit flowing in the saturating winding 86 and thereby controlling the current flow through the reactor to the primary 6 of the power transformer. As will be seen, an increase in the current flow through the saturating winding 86 operates to lower the reactance and increases the current flow to the primary 6, thereby increasing the battery charging rate.

Referring now more particularly to the voltage control unit, it will be seen that it contains its own alternating current supply and comprises a series of electronic tubes 90, 91, 92, 93 and 94, for which operating potentials are provided as a unit.

The tube 91 is a full-wave rectifier connected in a usual circuit with the high voltage secondary 96 of a voltage supply transformer 97 having a primary 98. The secondary 96 has the usual center tap 99 to which is connected a negative high voltage power supply lead 100, while the positive high voltage supply lead, indicated at 101, is connected with the cathode circuit 102 in the usual manner for full-wave high voltage rectifier circuits. The high voltage output is smoothed by a suitable filter capacitor 103 connected between the leads 100 and 101.

The high voltage lead 101 is extended through a lead 203 and the plug connector 85, to an external lead 104 connected with one side of the saturating winding 86. The opposite terminal of the saturating winding is connected through an external lead 105 and the plug connector to an internal plate lead 106 connected with the anode 107 of the tube 90. This tube is a triode, having a filamentary cathode 108 and the usual control grid 109. The return circuit for the saturating winding 86 may further be traced through the space-path of the tube 90 to the cathode or filament 108, thence through a filament heating winding 110 therefor on the transformer 97, and the center tap thereon and thence through a return lead 111 to the negative supply lead 100.

Thus the triode 90 operates as a current control tube for the saturating winding 86 to supply controlled current from the rectifier source to the reactor. The value of the saturating current varies in response to changes in bias potential applied to the grid 109. This grid is directly coupled through a lead 114 with an anode 115 in the tube 94, which in the present example is a dual triode of the type known commercially as a 6SL7 tube, having two separate cathodes 116 and 117, a second anode 118, and control grids 119 and 120 respectively associated with the anodes 118 and 115.

The anode-grid connecting lead 114 is provided with a coupling impedance or resistor 121 connected to a terminal 122 which in turn is connected through a suitable filter, comprising a series filter resistor 123 and a filter capacitor 124, with the high voltage positive supply lead 101. The resistor 121 may be of the order of one megohm while the filter resistor 123 may be of the order of 500,000 ohms.

Likewise the anode 118 is connected directly with the grid 120 through a lead 126 and is likewise connected with the terminal 122 through a coupling resistor 127 also of the order of one megohm. The cathode 116 is connected through a lead 128 with a positive voltage supply terminal 129, which in turn is connected through a series supply resistor 130 with the negative supply lead 100 for the high voltage supply circuit. The resistor 130 may be of the order of 20,000 ohms.

The lead 100 is also the positive lead for a second high voltage rectifier supply circuit which includes the tube 92 as a half-wave rectifier, connected between one terminal of the secondary 96 as indicated at 131, and an output lead 132 connected through a resistor and capacitor network 125 with the cathode 117 of the tube 94. The tube 93, which is a voltage regulator tube, is connected between the terminal 129 and the lead 132. A filter capacitor 133 is connected between the lead 100 and the lead 132, thereby to filter the rectifier output. It will be seen that the rectifier 92 derives energy from the lower half of the secondary 96, as viewed in the drawing, and the voltage output is applied across the voltage regulator tube 93, that is between terminal 129 and the lead 132. It will also be noted that the lead 132 is connected to a center tap 135 on a filament heating secondary 136 on the transformer 97, which secondary may be connected to the various heaters of the tubes in the voltage control unit such as the heaters for the tubes 92 and 94 in the present example. These connections are not shown, for the sake of simplifying the drawing.

It will be noted that the primary 98 is supplied with operating current through a pair of leads 134 and 137 which extend through the plug connector 85 and terminate respectively at the tap 10 on the power transformer primary 6 and the lead 64 which is connected with the lead 44, thereby supplying the primary 98 with a step-up voltage with respect to the active operating section of the primary 6, as will hereinafter be referred to.

It will thus be seen that the voltage supply units comprise two interconnected voltage rectifier circuits for supplying operating voltages which are indicated in the circuit at E1 and E2. The voltage E1 is utilized as hereinbefore described for controlling the saturation of the reactor 49. The voltage E2 is substantially constant as a reference voltage for charging current control, by reason of the voltage regulator tube being connected in circuit. This voltage is utilized to supply current to three resistors in series, connected between the terminal 129, which is the positive terminal, and the lead 132, which is the negative lead or terminal, for the second rectifier circuit.

The resistor circuit may be traced from the terminal 129 through the resistor 138, thence through a lead 139 and through the plug connector 85 to an external lead 140, thence to the upper terminal 141 of the resistor 87 to its lower terminal 142, and returning through a lead 143 and the plug connector 85 to an internal lead 144, and finally through a resistor 145 to the negative lead 132. This connection provides a voltage divider of which the resistor 138 is a voltage dropping resistor for the potentiometer resistor 87 and the resistor 145 which are voltage supply resistors. This circuit is shown more clearly in Figure 2 to which attention is now directed along with Figure 1, and in which like reference characters are used to indicate like circuit elements and circuits as in Figure 1.

Referring to Figures 1 and 2, it will be seen that a voltage Ec is provided between the negative lead 132 and the movable contact 88 on the potentiometer 87 and that the contact 88 is positive. This contact is connected through a voltage supply lead 148 with the switch terminal 78 and is thereby effectively connected to the positive battery terminal 37, all as clearly indicated in Figure 2.

The negative battery terminal 38 is connected with the terminal 75 and thence through a second voltage control lead 149 and an internal lead 150, connected through the plug connector 85, and thence through a filter resistor 151 connected to the control grid 119 of the tube 94. A capacitor 152 connected between the grid and the cathode 117 completes a low-pass filter for the grid in connection with the resistor 151, and serves to filter out oscillations due to feed-back and also averages the half-wave pulses to provide an average rectified control voltage on the grid.

With this arrangement, the battery voltage Eb is connected serially in opposition to the voltage Ec between the cathode 117 of the tube 94 and the control grid 119. By adjusting the contact 88 along the potentiometer 87 it will be seen that a point may be reached at which the voltages Ec and Eb may be equal. In practice, however, the adjustment is generally such that the voltage on the grid is slightly negative, such as of the order of 1 volt or slightly greater for the tube type shown, to provide proper charging current rate.

Furthermore, the voltage divider network provided by the resistors 138, 87 and 145, in series, is such that the positive or upper terminal 141 of the control potentiometer 87 is approximately 8 volts positive, whereas the lower terminal is of the order of 5 volts positive, as indicated, both with respect to the cathode 117 of the input stage, thereby to provide for substantially balancing the battery voltage between its fully discharged and full charged values and thereby to place upon the control grid 119 any desired biasing voltage for determining the charging rate as will now be described.

From an inspection of the circuit of the voltage control unit it will be seen that the tube 94 provides a two-stage direct coupled or A.-C. amplifier between the control grid 119 and the control grid 109 of the current control tube 90 for the saturable reactor 49. Variation in the voltage on the grid 119 causes the current through the saturating winding 86 to vary in accordance therewith and the variation is subject to the amplification provided by the two-stage amplifier in connection for the current control tube.

Specifically, assuming that a state of equilibrium exists in the control circuit shown, whereby the saturable reactor under control of the winding 86 permits sufficient current to flow to the power transformer to cause a charging rate of 100 amperes, for example, on the battery 39, that is, with the control switches closed in the position shown, and the supply leads 43 and 44 energized from a suitable alternating current source, an increase in negative potential on the grid 119 as may be caused by an increase in the voltage of the battery resulting from charge, the space current through the anode 118 and the resistor 127 is reduced proportionately, thereby reducing the voltage drop through the resistor 127 and causing the anode or grid end thereof, referring to the control grid 120, to become more positive.

With a more positive potential on the grid 120, the space current from the anode 115, and the current through the coupling resistor 121 will increase, thereby increasing the voltage drop through the resistor 121 and causing the grid 109 of the current control tube 90 to become more negative with respect to the cathode 108, thereby reducing the current flowing through the control tube and the current flow through the saturating winding 86. This, in turn, causes the reactor to reduce the current flow to the primary 6 of the power transformer, and, therefore, reduces the charging rate of the battery. In this manner the charge rate is successively reduced automatically as the battery comes up to full charge.

Because of the interposition of the series reactor in the primary circuit of the power transformer the applied primary voltage is normally lower than full value and the tap 10 or a similar high voltage tap is provided for supplying a normal voltage to the primary 98 of the voltage control unit so that full operating voltage may be applied to the voltage control unit particularly with the reactor 49 in full operation to control the charging rate.

Rough adjustments of the charging rate may be provided as hereinbefore pointed out, by adjusting the tap 13 along the tap connections 7—12 of the primary 6 of the power transformer. The connection shown provides the highest charging rate. Fine adjustments of the charging rate are provided by adjusting the control potentiometer contact 88, observing the ammeter 33 until the proper charging rate is obtained, whereupon, as hereinbefore indicated, the charging rate tapers off as the battery charges.

During the charge and afterward, in testing the battery under load, the volt meter connections may be shifted to read each of the cells, as the contact points 72 are moved by the control knob 80 as hereinbefore described.

From the foregoing description it will be seen that a simplified and rugged full-wave battery charging system is provided through the medium of the current control unit and that through the voltage control unit and the external control circuit to the battery and to the voltage divider network, the entire charging control is simplified both in construction and operation.

The entire system may be operated by unskilled operators and in any suitable location where alternating current supply is available. Furthermore, it will be seen that the voltage control unit may quickly be detached and replaced with a new unit should the device fail to function properly and require adjustment or repair, thus permitting the system to operate without interruption, and in any case the system is operable to a degree with some attendance without the voltage control unit as hereinbefore referred to.

In any case however, the charging rate may be determined by a simple control adjustment and without the danger of its being exceeded during the operation of the apparatus throughout the charging period. The entire system is readily constructed of relatively simple electrical parts and includes a minimum of electrical circuits and electronic tubes, whereby it may be manufactured at low cost.

What is claimed as new and useful is:

1. In an alternating current operable battery charging system, rectifier means providing a direct current charging output at an adjustable rate, and means for tapering said rate to a reduced value in response to increased battery voltage comprising a control circuit providing an adjustable direct-current output, a saturable reactor controlling the current flow to said rectifier, means controlling the saturating current applied to said reactor, means controlling the bias on said first-mentioned control means to vary the reactor saturation and the charging rate, and a circuit including a filter network for applying the differential voltage output from said control circuit and said battery voltage of said second-mentioned means to vary the bias potential therefrom, thereby to effect said tapering of the charging rate.

2. In a battery charging system for alternating current operation, a full-wave rectifier having direct current output terminals for connection with a battery to be charged, transformer means for applying alternating current to said rectifier, a saturable reactor controlling the power input to said transformer, a bias controlled amplifier tube for applying a variable direct current to said saturable reactor, a direct coupled amplifier connected with said control tube to control the bias and vary the flow of current therethrough, said direct coupled amplifier having an input control grid provided with a negative battery connection and having a cathode, a source of constant direct-current potential having a negative terminal connected with said cathode, and a voltage divider network connected with said constant voltage source and having a variable positive battery connection thereon, whereby the biasing potential on said input control grid may be adjusted with respect to a predetermined battery voltage to establish a predetermined charging rate which tapers in response to a continued charge upon a battery connected with said output terminals.

3. The combination as defined in claim 2 wherein a multiple unit switch is provided for simultaneously controlling the rectifier output current to said terminals and the application of power to said transformer means, and wherein said bias controlled amplifier tube, said direct coupled amplifier and constant direct current potential source are included in a detachable voltage control unit.

4. A high current battery charging system comprising in combination, a full-wave rectifier stack having positive and negative output terminals adapted to receive a battery charging connection, output current indicating means therefor, means including a saturable current controlling reactor for applying alternating current to said rectifier stack, a direct-coupled amplifier, a control circuit for said direct-coupled amplifier adapted to be connected with the positive and negative terminals of a battery to be charged, said control circuit having a negative lead terminating in the input grid of said amplifier, a potentiometer device having an adjustable contact, said control circuit having a positive lead connected with said contact, a constant voltage direct current source having positive and negative terminals connected with the terminals of said potentiometer device, a cathode circuit for said direct-coupled amplifier connected with the negative terminal of said source, whereby adjustment of said potentiometer contact varies a differential biasing potential on said direct coupled amplifier, a current control tube coupled to said amplifier for receiving a resultant variable biasing potential therefrom, and rectified alternating current supply means for applying saturating current to said reactor through said current control tube.

5. The combination as defined in claim 4 wherein the direct-coupled amplifier input grid connection from the control circuit includes a resistance-capacity filter.

6. The combination as defined in claim 4 wherein the current control tube and the direct-coupled amplifier together with the constant voltage source are included in a separate voltage control unit having an alternating current supply connection with the full-wave rectifier power supply means.

7. The combination as defined in claim 4 further characterized by the fact that selective switching means are provided therein for controlling battery charging and rectifier supply currents and a predetermined battery load alternatively, and that selective switching and indicating means are provided for observing the individual cell voltages of a multiple cell battery.

8. In a battery charging system, the combination with an alternating current rectifier, of means for deriving charging current therefrom at a predetermined high rate including indicating means for said charging current, means for applying alternating current to said rectifier including a transformer having a primary circuit and a saturable reactor therein, a control winding for said reactor and a direct current supply circuit therefor including a current control tube, a direct-coupled amplifier connected with said control tube for varying the impedance thereof in response to input grid voltage applied to said amplifier, and a grid biasing supply circuit for said amplifier including a battery connection having positive and negative leads between which in operation a predetermined initial battery voltage is established, means providing a constant voltage source having positive and negative terminals, a voltage divider network connected therewith, and a variable positive connection on said network for said control circuit to apply thereto a voltage in opposition to said initial voltage thereby to provide a differential biasing voltage for said amplifier which varies with the degree of charge to establish an initial charging rate which automatically is tapered in response to an increase in battery voltage with respect to said applied voltage.

9. A high current battery charging system comprising, in combination, a power supply transformer, a saturable reactor connected therewith for controlling the current flowing thereto and having a current control winding, a current control tube connected in circuit with said control winding and having a control grid, means providing substantially a constant voltage source of direct current, a voltage divider network connected in shunt therewith and including a potentiometer resistor having a variable tap connection thereon, a positive battery lead coupled to said tap connection, a two-stage direct-coupled control amplifier comprising an input amplifier tube having an input control grid and a cathode and an output stage having an anode coupled to said current control tube for varying the biasing potential thereon in response to a variation in biasing potential on said input control grid, said cathode having a circuit connection with the negative end of said voltage divider network and said input control grid having a negative battery connection, a filter network in said last named connection, a low voltage secondary for said power transformer, a pair of battery charging terminals connected therewith and a full-wave power rectifier in said last named connection.

10. A high current battery charging system comprising, in combination, a current control unit having positive and negative output charging terminals adapted to be connected with battery charging leads, a full-wave contact rectifier stack having a positive output lead connected with the positive output terminal and a negative output lead connected with said negative output terminal, a charging control switch and a current indicating device interposed in said last named connections, a power transformer having a low voltage secondary connected with said full-wave rectifier stack to apply charging current thereto for rectification, a power supply circuit for said transformer, a saturable reactor having a winding connected serially in said power supply circuit and having a direct current control winding, a voltage control unit including a current control tube connected with said reactor control winding for regulating the flow of current thereto, a direct coupled amplifier coupled to said control tube and including an input tube having a control grid and a cathode, a source of constant voltage in said voltage control unit having positive and negative terminals, a voltage divider network connected across said constant voltage source between said terminals and having a connection with the said cathode at the negative end thereof, means providing a variable tap connection on said voltage divider network between the ends thereof, a positive battery lead coupled to said tap connection and a negative battery connection lead coupled to said last named grid.

11. In an alternating current operable battery charging system, a current control unit comprising a transformer and rectifier means providing a direct current charging output at an adjustable high rate, current and voltage indicating means therefor, and a separable voltage control unit connected with said current control unit including means for automatically tapering said charging output to a reduced value in response to increased battery voltage, said means comprising a control circuit providing an adjustable direct-current output in opposition to a battery output voltage to establish a desired initial charging rate, a saturable reactor controlling the current flow to said rectifier through said transformer in the current control unit, a bias controlled tube for regulating the saturating current applied to said reactor, a direct coupled amplifier controlling the bias on said control tube to vary the reactor saturation and the charging rate, a circuit for applying the differential voltage output from said control circuit and said battery voltage to said direct coupled amplifier to vary the bias potential output therefrom, positive and negative output terminal means for said system connected with said rectifier, and selective switching means for de-energizing the rectifier and voltage control unit and applying a load resistor to said terminal means.

12. In a high current battery charging system, a saturable reactor controlled charging circuit, reactor control means for said circuit, a battery potential supply circuit and a variable voltage supply circuit interconnected to provide a variable differential control voltage for said reactor control means, a direct coupled amplifier connection for applying said differential voltage to said reactor control means in a direction to cause a reduction in charging rate in response to an increase in battery potential in said first supply circuit, and means for adjusting said variable voltage supply circuit, whereby said rate is tapered in response to increase in battery potential in said first named circuit.

13. In an alternating current operable battery charging system, rectifier means providing a direct current charging output at an adjustable high rate, and means for automatically tapering said rate to a reduced value in response to increased battery voltage comprising a control circuit providing an adjustable direct-current output in opposition to a battery output voltage to establish a desired initial charging rate, a saturable reactor controlling the current flow to said rectifier, a bias controlled tube controlling the saturating current applied to said reactor, a direct coupled amplifier controlling the bias on said control tube to vary the reactor saturation and the charging rate, and a circuit including a filter network for applying the differential voltage output from said control circuit and said battery voltage to said direct coupled amplifier to vary the bias potential output therefrom, thereby to effect said tapering charging rate in response to measured battery voltage.

14. In a high current battery charging system, a saturable reactor controlled charging circuit, a reactor current control tube for said circuit, a battery potential supply circuit and a variable voltage supply circuit interconnected to provide a variable differential control voltage for said tube, a direct coupled amplifier connection for applying said differential voltage to said control tube in a direction to cause a reduction in charging rate in response to an increase in battery potential in said first supply circuit, and means for adjusting said variable voltage supply circuit, whereby said rate is tapered in response to increase in battery potential in said first named circuit.

CHARLES CROSS.

REFERENCES CITED

The following references are of record in the file of this patent:

UNITED STATES PATENTS

| Number | Name | Date |
|---|---|---|
| 1,264,021 | Crosby | Apr. 23, 1918 |
| 2,031,509 | Seeley | Feb. 18, 1930 |
| 2,040,492 | Logan | May 12, 1936 |
| 2,066,943 | Philpott | Jan. 5, 1937 |
| 2,074,552 | Logan | Mar. 23, 1937 |
| 2,079,500 | Foos | May 4, 1937 |
| 2,084,900 | Edwards et al. | June 22, 1937 |
| 2,114,827 | Aggers | Apr. 19, 1938 |
| 2,270,894 | Overbeck | Jan. 27, 1942 |
| 2,306,998 | Claesson | Dec. 29, 1942 |
| 2,331,131 | Moyer | Oct. 5, 1943 |
| 2,341,446 | Klinkhamer et al. | Feb. 8, 1944 |
| 2,423,114 | Potter | July 1, 1947 |
| 2,431,312 | Cronvall | Nov. 25, 1947 |
| 2,431,707 | Pugh | Dec. 2, 1947 |

FOREIGN PATENTS

| Number | Country | Date |
|---|---|---|
| 521,828 | Great Britain | May 31, 1940 |
| 535,702 | Great Britain | Apr. 18, 1941 |